Figures 1, 2, 3, 4:
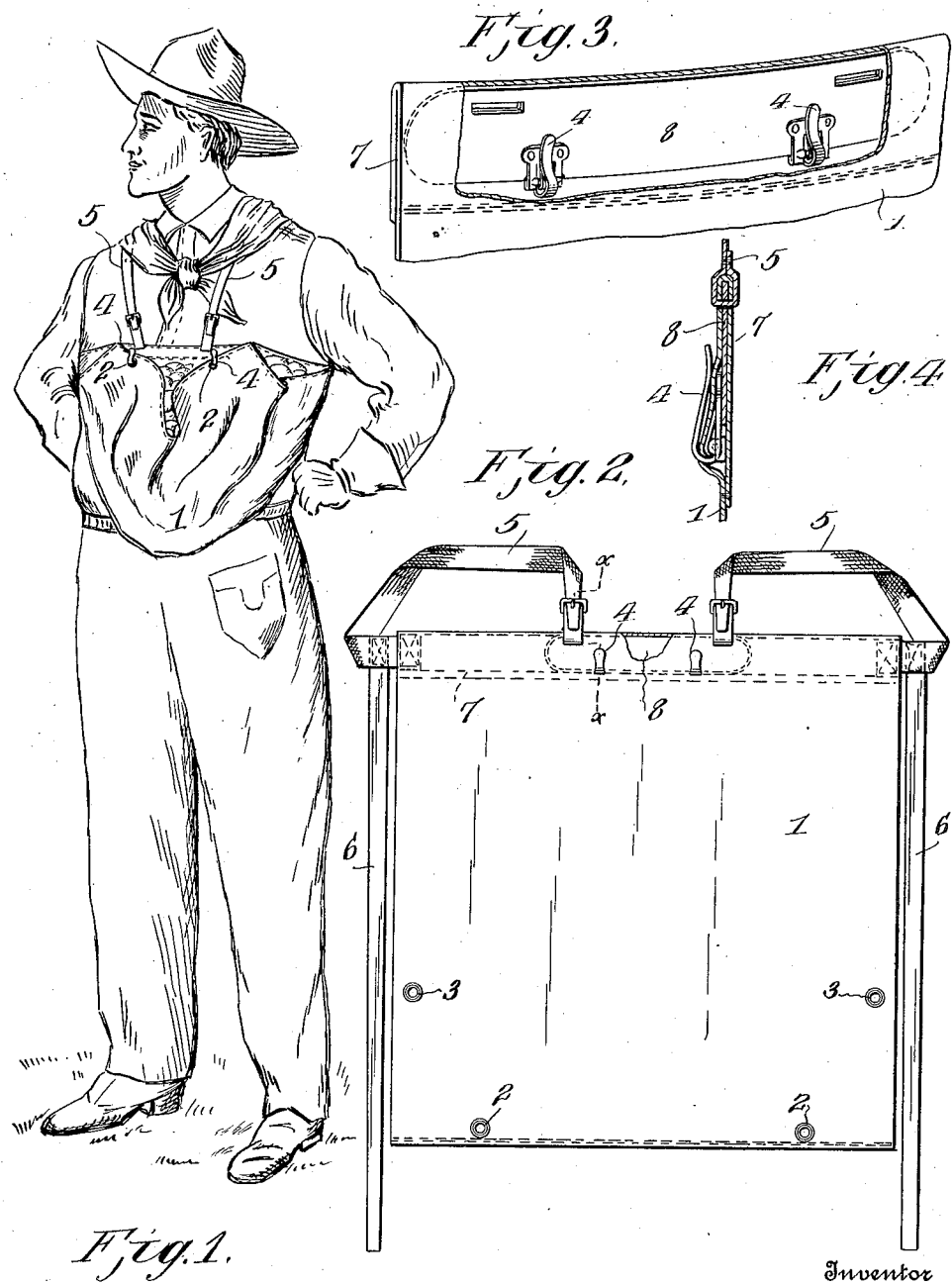

E. T. REESE.
FRUIT PICKER'S APRON.
APPLICATION FILED MAY 16, 1913.

1,094,250.

Patented Apr. 21, 1914.

Witnesses
Frank Hough
V. B. Hillyard.

Inventor
E. T. Reese,
By Victor J. Evans
Attorney

UNITED STATES PATENT OFFICE.

EBENEZER T. REESE, OF GRANGER, WASHINGTON.

FRUIT-PICKER'S APRON.

1,094,250.

Specification of Letters Patent. Patented Apr. 21, 1914.

Application filed May 16, 1913. Serial No. 768,102.

*To all whom it may concern:*

Be it known that I, EBENEZER T. REESE, a citizen of the United States, residing at Granger, in the county of Yakima and State of Washington, have invented new and useful Improvements in Fruit-Pickers' Aprons, of which the following is a specification.

The invention has for its object to facilitate the gathering of fruit and at the same time prevent bruising thereof during the gathering operation.

The invention provides an apron which ordinarily affords protection in the usual way but which may be adjusted to form a pocket for holding fruit as the same is plucked, the pocket thus formed having a middle and side openings to provide for the convenient introduction of the fruit as the same is gathered.

A further purpose of the invention is the provision of an apron which when formed into a pocket for receiving the fruit will maintain the required shape whereby the fruit deposited therein is prevented from escaping, said pocket being arranged to distribute the weight about the gatherer and admitting of both hands being free to be used for picking the fruit. The construction is such that when it is required to deposit the gathered fruit into a receptacle the apron may be adjusted to cause the fruit to roll into said receptacle without injury thereto, the lower portion of the apron being readily disconnected from and attached to a reinforced band at the top of the apron and which extends about the chest of the gatherer.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a perspective view, showing the application of the invention, the lower portion of the apron being gathered and attached to the band so as to form the pocket for receiving the fruit. Fig. 2 is a view of the apron extended. Fig. 3 is a detail view in perspective of the reinforcement for the band at the upper end of the apron. Fig. 4 is a section on the line $x$—$x$ of Fig. 2.

Corresponding and like parts are referred to in the following description, and indicated in all the views of the drawing, by the same reference characters.

The apron 1 may be of any size or material and is usually formed of canvas or duck. Openings 2 are provided in edge portions of the apron a short distance from the lower end. Other openings 3 are provided in the lower portion a short distance from the vertical edges. When the apron is adjusted to form the pocket for receiving the fruit the corner portions thereof are gathered or folded to admit of the openings 2 and 3 being brought together, said openings receiving hooks 4 located at the band provided at the upper end of the apron. When the corner portions of the apron are thus gathered and the lower part of the apron folded upwardly a pocket is formed extending the full width of the apron, said pocket having its middle portion lower than its end or side portions, with the result that fruit deposited in such pocket will not tend to escape therefrom. The pocket thus formed has three openings, a middle opening between the hooks 4 and side openings exterior to such hooks, thereby admitting of the fruit being conveniently deposited into the pocket through any one of the three openings. Shoulder straps 5 are attached to the band of the apron and other straps 6 are attached to the shoulder straps and are adapted to be passed about the body of the gatherer and tied or otherwise fastened to hold the apron in proper position. The upper portion of the apron is reinforced by means of a hem 7 and a metal strip 8 is located within the hem 7 and serves to stiffen and further reinforce the upper end of the apron whereby the pocket is properly maintained for receiving the fruit. The hooks 4 are attached to the metal strip 8 and their bills are located upon the front side of the apron in convenient position to receive the edge portions of the apron having the side and bottom openings 2 and 3.

When the apron is placed in position the straps 5 pass over the shoulders and the straps 6 extend about the body. When it is required to form the pocket the corner portions of the apron are gathered or folded to bring the eyes 2 and 3 in register after which said eyes are adjusted to receive the hooks 4. The pocket thus formed extends across the front of the gatherer and along the sides and has a middle and side openings for receiving the fruit. When it is required to empty the pocket the eyes 2 and 3 are disengaged from the hooks and the apron permitted to extend, said apron at the same time being manipulated to direct the fruit into the receptacle into which it is delivered by a rolling action, thereby preventing the same being bruised or otherwise injured.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. An apron for fruit pickers, means at its upper end for attaching the same to the body, hooks at such upper end of the apron, the lower portion of the apron having openings near its edges a short distance from the bottom and having other openings in its bottom portion a short distance from its vertical edges, said openings being adapted to be brought in register by folding or gathering the corner portions of the apron and engaging said openings with the before mentioned hooks to provide a pocket having a middle and side openings.

2. An apron having openings in its edge and bottom portions, a reinforcement secured to the upper end of the apron, hooks attached to the reinforcement and adapted to receive the openings in the lower and edge portions of the apron when the corner portions are gathered to form a pocket, shoulder straps attached to the upper end of the apron, and body straps for securing the apron about the body of the gatherer.

In testimony whereof I affix my signature in presence of two witnesses.

EBENEZER T. REESE.

Witnesses:
R. B. GRESNER,
STEVE READEL.

---

Copies of this patent may be obtained for five cents each, by addressing the "Commissioner of Patents, Washington, D. C."